(12) United States Patent
Borase et al.

(10) Patent No.: US 12,146,530 B2
(45) Date of Patent: Nov. 19, 2024

(54) SENSORIZED ROLLER AND ASSOCIATED ROLLING BEARING

(71) Applicant: AKTIEBOLAGET SKF, Gothenburg (SE)

(72) Inventors: Sachin Shravan Borase, Bangalore (IN); Kishor Kamalakar Powar, Bangalore (IN)

(73) Assignee: AKTIEBOLAGET SKF, Gothenburg (SE)

(*) Notice: Subject to any disclaimer, the term of this patent is extended or adjusted under 35 U.S.C. 154(b) by 112 days.

(21) Appl. No.: 18/118,933

(22) Filed: Mar. 8, 2023

(65) Prior Publication Data
US 2023/0287937 A1 Sep. 14, 2023

(30) Foreign Application Priority Data
Mar. 14, 2022 (IN) .............. 202241013840

(51) Int. Cl.
F16C 19/36 (2006.01)
F16C 19/38 (2006.01)
(Continued)

(52) U.S. Cl.
CPC .............. F16C 41/00 (2013.01); F16C 19/36 (2013.01); F16C 19/386 (2013.01); F16C 19/522 (2013.01); F16C 33/34 (2013.01); F16C 33/366 (2013.01); G01L 5/0009 (2013.01); F16C 2226/38 (2013.01); F16C 2226/74 (2013.01); F16C 2233/00 (2013.01)

(58) Field of Classification Search
CPC ...... F16C 19/36; F16C 19/361; F16C 19/364; F16C 19/386; F16C 19/522; F16C 33/34; F16C 33/366; F16C 41/00; F16C 41/008; F16C 2226/36; F16C 2226/38; F16C 2226/40; F16C 2233/00; G01L 5/0009; G01L 5/0019
See application file for complete search history.

(56) References Cited

U.S. PATENT DOCUMENTS

| 5,503,030 A * | 4/1996 | Bankestrom | F16C 41/008 73/862.541 |
| 2011/0182536 A1* | 7/2011 | Matsuda | F16C 41/008 384/572 |

(Continued)

FOREIGN PATENT DOCUMENTS

| CN | 107542758 A | 1/2018 | |
| DE | 102015216472 A1 * | 3/2017 | .............. F16C 19/52 |

(Continued)

Primary Examiner — Phillip A Johnson
(74) Attorney, Agent, or Firm — J-TEK LAW PLLC; Scott T. Wakeman; Mark A. Ussai

(57) ABSTRACT

A sensorized roller for a rolling bearing includes a roller body having an axial length and a bore that extends axial through the roller body and a housing in the roller bore. The housing includes a central sensing module having an axial length and at least one sensor in the central sensing module configured to measure at least one parameter related to a condition of the sensorized roller, an antenna module having an axial length that is secured to a first axial end of the central sensing module and a power module having an axial length that is secured to a second axial end of the central sensing module.

12 Claims, 3 Drawing Sheets

(51) Int. Cl.
   *F16C 19/52*   (2006.01)
   *F16C 33/34*   (2006.01)
   *F16C 33/36*   (2006.01)
   *F16C 41/00*   (2006.01)
   *G01L 5/00*    (2006.01)

(56) References Cited

U.S. PATENT DOCUMENTS

| | | | |
|---|---|---|---|
| 2012/0020603 A1* | 1/2012 | Stubenrauch | F16C 19/522 |
| | | | 384/448 |
| 2014/0157880 A1* | 6/2014 | Matsuda | F16C 41/008 |
| | | | 73/112.01 |
| 2018/0003492 A1 | 1/2018 | Ham et al. | |
| 2018/0340575 A1* | 11/2018 | Ziegler | F16C 41/007 |

FOREIGN PATENT DOCUMENTS

| | | | | |
|---|---|---|---|---|
| DE | 102017210286 A1 * | 1/2018 | | F16C 19/361 |
| EP | 3857082 B1 * | 3/2022 | | F16C 19/522 |

* cited by examiner

SENSORIZED ROLLER AND ASSOCIATED ROLLING BEARING

CROSS-REFERENCE

This application claims priority to Indian patent application no. 202241013840 filed on Mar. 14, 2022, the contents of which are fully incorporated herein by reference.

TECHNOLOGICAL FIELD

The present disclosure is directed to the monitoring of rolling bearing. More particularly, the disclosure is directed to a sensorized roller for monitoring a rolling bearing.

BACKGROUND

The documents US 2018/0003492 and family member CN 107542758 disclose a roller bearing comprising two rings configured to rotate concentrically relative to one another and two rows of rollers interposed between a first raceway provided on the first ring and a second raceway provided on the second ring. One of the rollers is a sensorized roller having the same axial length as the rest of the rollers. The sensorized roller comprises a roller body provided with a bore and a cylindrical housing inserted in the bore.

The housing encloses measurement devices for measuring deformation of the roller and electronics for processing a deformation signal from the measuring devices and for wirelessly transmitting the processed deformation signal to an external receiver. The housing ensures proper alignment in the roller body and provides protection against contamination from outside the roller. The housing comprises two semi-cylindrical housing portions which are joined by first and second end caps that fit over first and second axial ends of the two housing portions. Because the axial length of the rollers depends on the length of the rollers, the housing needs to be changed based on length of the sensorized roller length leading to manufacturing and storing a multitude of variants of housing having different axial length.

SUMMARY

Consequently, an aspect of the present disclosure is to reduce the stored number of stored housing variants.

According to an aspect of the disclosure, a sensorized roller element for a rolling bearing is disclosed that incudes: a roller body provided with a roller bore that extends through the roller body about an axis thereof and a housing that is shaped to fit within the roller bore. The housing includes a central sensing module containing at least one sensor configured to measure parameters related to the condition of the sensorized roller. The at least one sensor is secured to the central sensing module, and an antenna module is secured to a first end of the central sensing module. An antenna is secured to the antenna module, and a power module is secured to a second opposite end of the central sensing module. Power supply means are secured to the power module. The housing is segmented into three parts to form a modular housing that permits each module to be manufactured separately thereby reducing the manufacturing time and permitting the modules to be quickly assembled to obtain the housing. Advantageously, the sum of the axial lengths of the central sensing module, antenna module and power module in the secured position is equal to the axial length of the roller body. Preferably, the central sensing module, the antenna module and the power module are cylindrical parts. Advantageously, the antenna module comprises a first end cap secured to the first end of the central sensing module, and the power module comprises a second end cap secured to the second end of the central sensing module. Preferably, each of the first and second end caps of the antenna module and power module are provided with removable axial retaining means configured to cooperate with the central sensing module. Advantageously, the axial lengths of the first and second end caps are equal.

Preferably, the antenna module comprises a first end cap and a first connecting element securing the first end cap to the first end of the central sensing module, and the power module comprises a second end cap and a second connecting element securing the second end cap to the second end of the central sensing module. Advantageously, the first connecting element and the second connecting element are secured to the central sensing module with permanent axial retaining means, the first end cap and the first connecting element are secured together with first removal axial retaining means, and the second end cap and the second connecting element are secured together with second removal axial retaining means. Preferably, the axial lengths of the first end cap and the second end cap are equal.

According to a further aspect, a sensorized roller for a rolling bearing includes a roller body having an axial length and a bore that extends axial through the roller body and a housing configured to fit in the roller bore. The housing includes a central sensing module having an axial length and including at least one sensor configured to measure at least one parameter related to a condition of the sensorized roller, an antenna module having an axial length and being secured to a first axial end of the central sensing module and including an antenna and meeting the central sensing module at first joint, and a power module having an axial length and being secured to a second axial end of the central sensing module According to another aspect of the disclosure, a rolling bearing is disclosed. The rolling bearing comprises a first ring and a second ring configured to rotate concentrically relative to one another, and at least one row of rollers interposed between a first raceway and a second raceway respectively provided on the first and second rings. At least one of the rollers of the rolling bearing is a sensorized roller as defined above. Other advantages and features of the invention will appear on examination of the detailed description of embodiments, in no way restrictive, and the appended drawings.

BRIEF DESCRIPTION OF THE DRAWINGS

Embodiments of the invention are described below with reference to the attached drawings, which show a non-limiting example embodiment thereof, in which.

DETAILED DESCRIPTION

Figure 1:
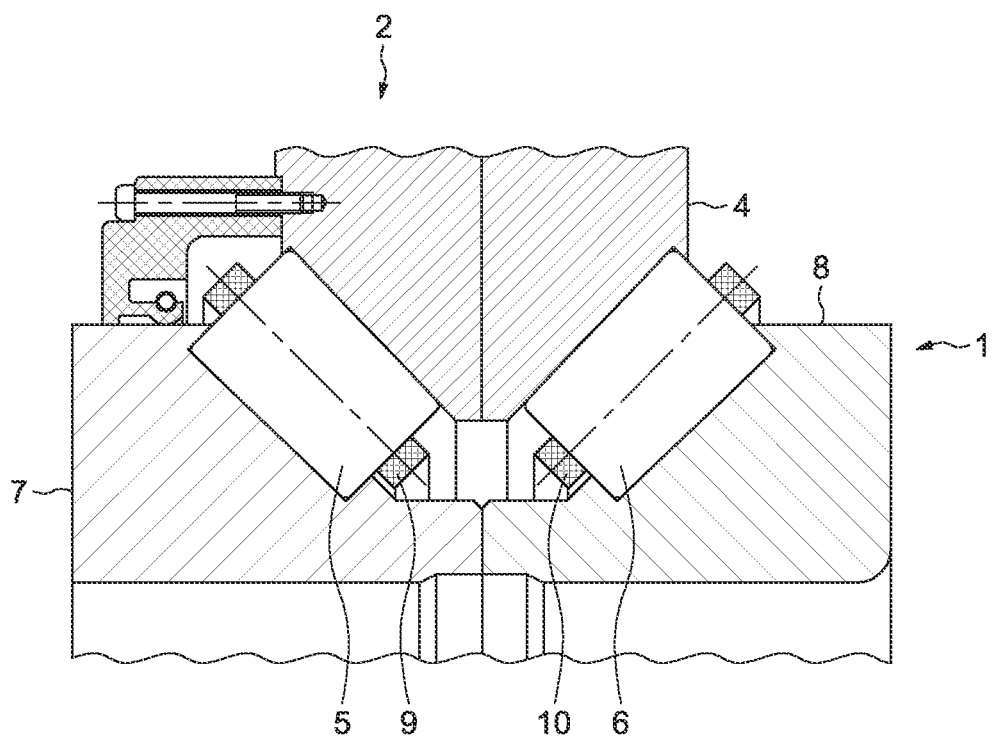
FIG. 1 is schematic side elevational view, partly in section, of a roller bearing in which a sensorized roller according to an embodiment of the present disclosure can be used.

Reference is made to FIG. 1 which represents an example of a machine 1 comprising a rolling bearing 2. The machine 1 is for example a wind turbine, the rolling bearing 2 supporting the main shaft of the wind turbine. In other embodiments, the machine may be a tunnel boring machine, a mining extraction machine or a big offshore crane.

The bearing 2 comprises a first outer ring 4 provided with conically shaped first and second outer raceways for a first row 5 and a second row 6 of rollers comprising tapered rollers. The bearing further comprises a second inner ring comprising a first and second inner rings 7, 8 which are respectively provided with conically shaped first and second inner raceways for the first and second roller rows 5, 6. In addition, a first cage 9 and a second cage 10 are provided for retaining the rollers of the first and second roller sets respectively. Typically, the cages are formed from segments that abut each other in circumferential direction.

To provide the necessary stiffness and ensure a long service life, the bearing is preloaded. The axial position of the inner rings 7, 8 relative to the outer ring 4 is set such that the first and second roller sets 4, 6 have a negative internal clearance. In the depicted bearing, at least one of the rollers in either of the first and second roller rows 5, 6 is replaced with a sensorized roller. In the rolling bearing 2 the rollers of the first and second sets of rollers 4, 6 comprises tapered rollers. In another embodiment, the rolling bearing 2 may comprise other type of rollers. The rolling bearing 2 may also comprise only one row of rollers or more than two rows of rollers.

Figure 2:
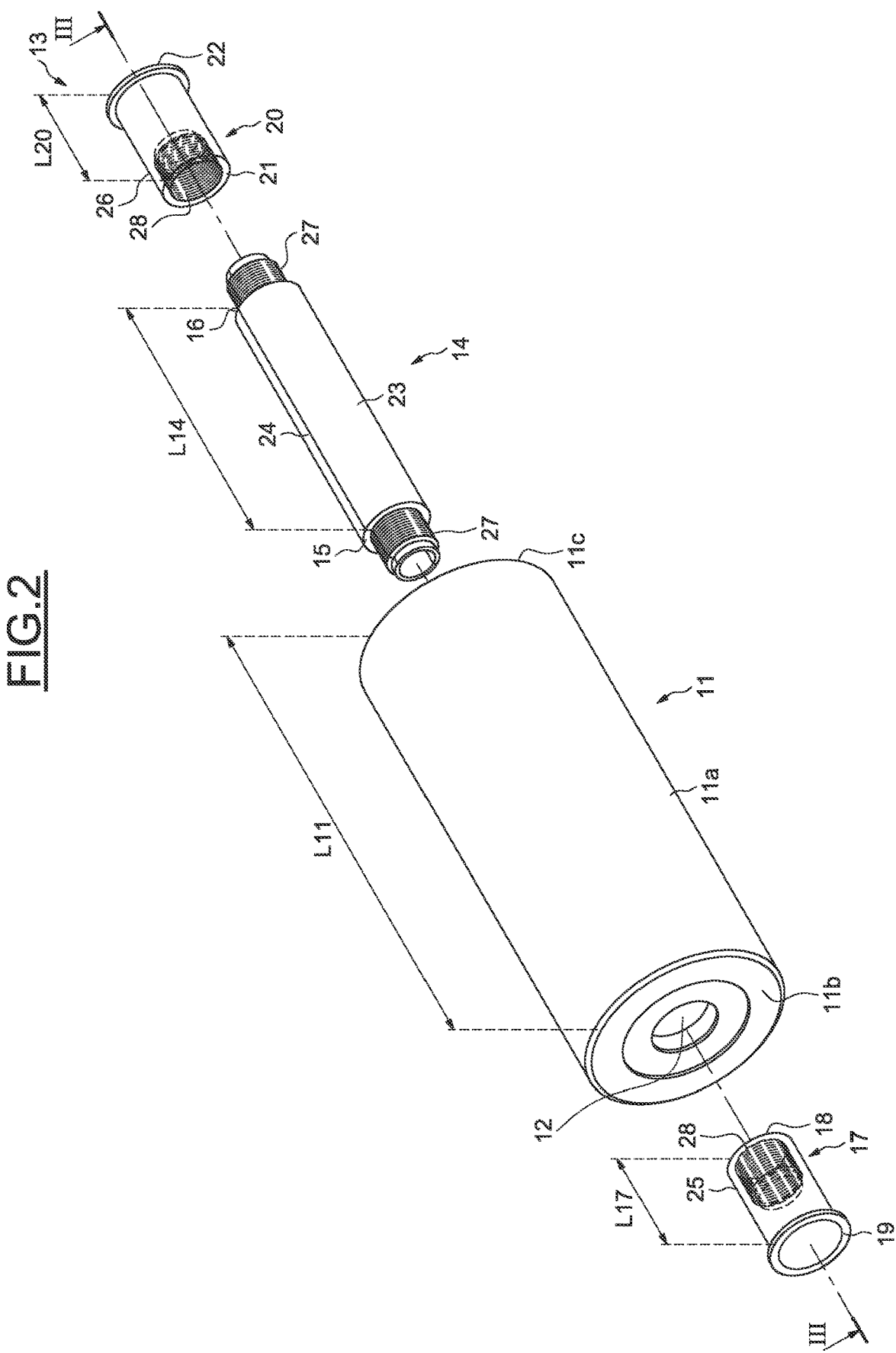
FIG. 2 is an exploded perspective view of a sensorized roller according to an embodiment of the present disclosure.

FIG. 2 schematically illustrates an example of a sensorized roller. The sensorized roller comprises a roller body 11 provided with an inner central bore 12 and a housing 13 located within the central bore 12. The roller body 11 is further provided with an outer rolling surface 11a which is radially opposite the bore 12, and with opposite first and second frontal faces 11b, 11c which axially delimit the bore 12 and the outer surface 11a of the roller body 11. The axial length L11 of the roller body 11 defines the axial length of the roller. The housing 13 extends through the roller body 11. The housing 13 comprises a central sensing module 14, an antenna module 17 secured to a first end 15 of the central sensing module 14, and a power module 20 secured to an opposite second end 16 of the central sensing module 14. The central sensing module 14 is formed from two semi-cylindrical housing haves 23, 24 which are held together by the antenna module 17 and the power module 20.

Figure 3:
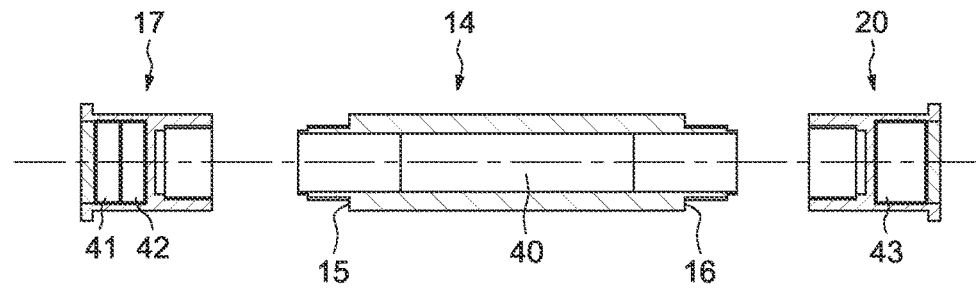
FIG. 3 is an axial cross-section of a housing of the sensorized roller of FIG. 2.

As shown on FIG. 3, the central sensing module 14 houses at least one sensor 40 for measuring parameters relating to the condition of the sensorized roller. The sensor 40 is secured to the central sensing module 14 and comprises for example a load sensor for measuring a load distribution across the sensorized roller. The antenna module 17 houses an antenna 41 secured to the antenna module 17. The antenna 17 may further house a wireless transmitter 42 connected to the antenna 41 to transmit the measurements of the sensor to a processing device (not represented) located outside the bearing for processing the measurements. The power module 20 houses a power supply 43 secured to the power module 20. The power supply 43 comprises for example a battery or an energy harvester. The central sensing module 14, antenna module 17 and power module 20 are cylindrical. In one variant, the central sensing module, antenna module and power module may have a different cross sectional shape that is complementary to a shape of the central bore 12 so that the housing 13 can be inserted within the central bore 12.

Referring once again to FIG. 2, a first end 18 of the antenna module 17 is secured to the first end 15 of the central sensing module 14, and a first end 21 of the power module 20 is secured to the second end 16 of the central sensing module 14. The central sensing module 14 has a first length L14 defined between the first end 15 and the second end 16 of the central sensing module 14. This first length L14 is equal to a first predetermined fixed value. The antenna module 17 has a second length L17 defined between the first end 18 and an opposite second end 19 of the antenna module 17. The power module 20 has a third length L20 defined between the first end 21 and an opposite second end 22 of the power module 20. The sum of the axial lengths L14, L17, L20 of the central sensing module 14, antenna module 17 and power module 20 in the secured position is equal to the axial length L11 of the roller body 11. Therefore, in the secured position, the second end 19 of the antenna module 17 is flush with the first frontal face 11b and the second end 22 of the power module 20 is flush with the second frontal face 11c. The housing 13 is segmented into three modules 14, 17, 20 to form a modular housing. As the first length L14 is the first predetermined fixed value, only the second length L17 and the third length L20 are adjusted so that the sum of the first length L14, the second length L17 and the third length L20 is equal to axial length L11 of the roller body 11. The second length L17 and the third length L20 are adjusted by choosing the antenna module 17 and the power module 20 among a plurality of antenna modules 17 and power modules 20 having different predetermined second length L17 values and third length L20 values. As the housing 13 is made of predefined modules 14, 17, 20 chosen so that the sum of the first length L14, second length L17 and third length L20 is equal to the axial length, the number of housing variants to be stored is reduced.

A plurality of antenna modules 17 and power modules 20 having different predetermined second length L17 values and third length L20 values are manufactured and stored instead of housing 13 variants. As the manufacturing of antenna modules 17 and power modules 20 is easier and quicker than manufacturing a sensor module known from the state of the art, the housing 13 made of the modules 14, 17, 20 is easier and quicker to manufacture leading to a decrease of the manufacturing costs. The second length L17 and the third length L20 may be equal. The modules 14, 17, 20 may be made of thermoplastic material for example PEEK, ABS, PEI, Nylon, Acetal, Polypropylene, Polycarbonate, Polyethylene terephthalate, LDPE, HDPE, UHMW-PE, Polystyrene. The thermoplastic material may be reinforced with fillers of carbon or glass fiber. In variant, the modules 14, 17, 20 may be made of thermoset material or Thermoplastic Elastomer. In the illustrated example, the antenna module 17 comprises a first end cap 25 and the power module 20 comprises a second end cap 26. The axial length of the first and second end caps 25, 26 may be equal. The first end cap 25 and the second end cap 26 are secured to the central sensing module 14 with removable axial retaining means comprising for example threads. The central sensing module 14 comprises, at each end 15 and 16, an outer thread 27 which protrudes axially with respect to the associated end. The antenna and power modules 17, 20 comprises an inner thread 28 opening onto the first end 18, 21 and cooperating with the outer thread 27.

In another variant, the removable axial retaining means may comprise snap fits for example annular snap fit, cantilever snap fits, hoop-strains, or ball and socket joints. In variant, the removable axial retaining means comprise threads and snap fits. In another variant, the removable axial retaining means comprise screws, dowels, or rivets. In another embodiment, the modules 14, 17, 20 are secured together by permanent axial retaining means so that the modules 14, 17, 20 are not removable, for example by ultrasonic welding process, by ultraviolet bonding process, by ultrasonic staking process, by heat staking process, or by bonding with solvent and adhesive bonding.

Figure 4:
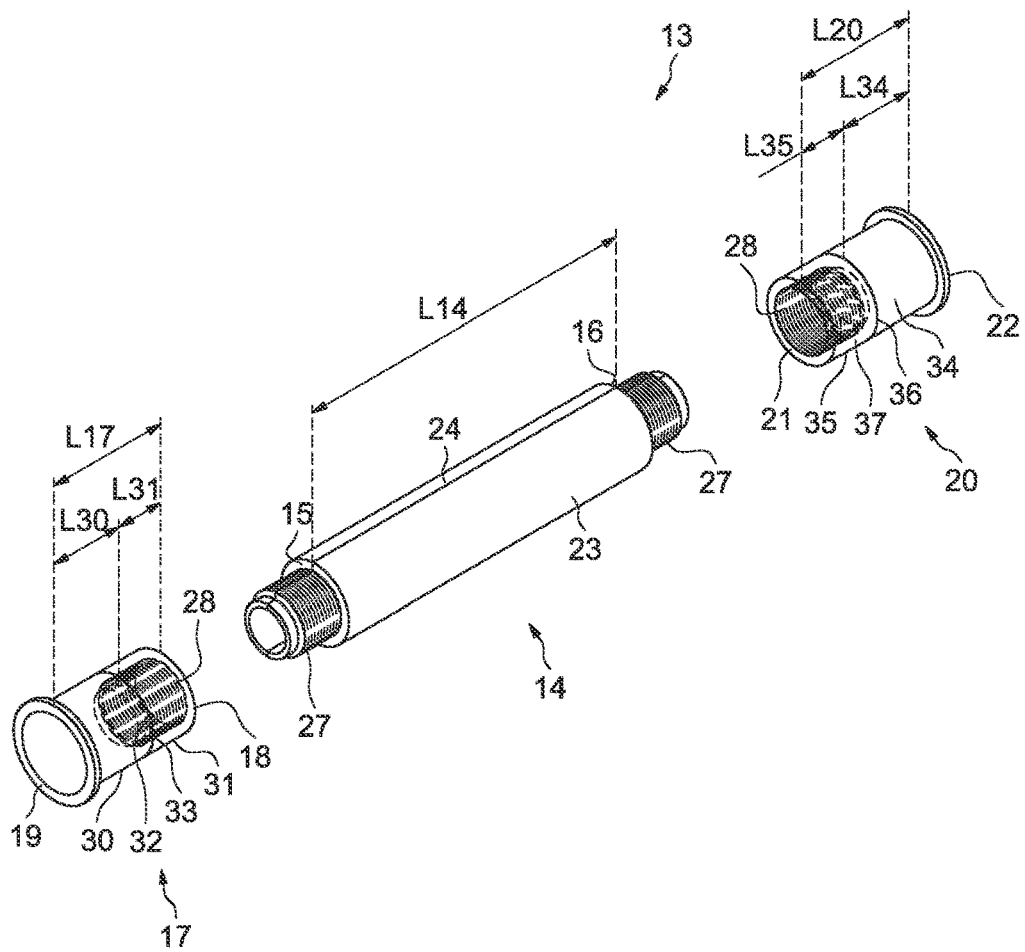
FIG. 4 is an exploded perspective view of another example of a housing for a sensorized roller according to the present disclosure.

FIG. 4 schematically illustrates another example of the housing 13. The housing 13 comprises the central sensing module 14, the antenna module 17 and the power module 20. The antenna module 17 comprises a first end cap 30 and a first connecting element 31 securing the first end cap 30 to the central sensing module 14. The first end cap 30 comprises a first end delimiting the second end 19 of the antenna module part 17 and a second end 32 opposite the first end of the first end cap 30. The first connecting element 31 comprises a first end 33 secured to the second end 32 of the first end cap 30 and a second end opposed to the first end 33 and delimiting the first end 18 of the antenna module 17. The second length L17 is equal to the sum of a length L30 of the first end cap 30 defined between the first 19 and the second 32 ends of the first end cap 30, and a length L31 of the first connecting element 31 defined between the first 33 and the second 18 ends. The length L30 of the first sub-part 30 is equal to a third predetermined value. The power module 20 comprises a second end cap and a second connecting element connecting the second end cap and the central sensing module 14. The third part 20 comprises a second end cap 34 and a second connecting element 35. The second end cap 34 comprises a first end delimiting the second end 22 of the power module 20 and comprises a second end 36 opposed to the first end of the second end part 34. The second connecting element 35 comprises a first end 37 secured to the second end 36 of the second end part 34, and a second end opposed to the first end 37 delimiting the first end 21 of the power module 20.

The third length L20 is equal to the sum of a length L34 of the second end cap 34 defined between the first and the second 36 ends of the second end cap 34, and a length L35 of the second connecting element 35 defined between the first 37 and the second ends. As the first length L14 and the length L30, L34 of the central sensing module 14, the first end cap 30 and the second end cap 34 are fixed, only the length L31, L35 of the first and second connecting elements 31, 35 are adjusted so that the sum of the first length L14, the second length L17 and the third length L20 is equal to the axial length L11 of the roller body 11 reducing the number of variants of housing 13. The axial length L30, L34 of the first end cap and the second end cap 30, 34 may be equal. The first connecting element 31 is secured to central power sensing module 14 by first removable or permanent axial retaining means, and the second connecting element 35 is secured to the central power sensing module 14 by second removable or permanent axial retaining means. The first and second removable and permanent axial retaining means are identical to the removable and permanent axial retaining means described above. The first connecting element 31 is secured to the first end cap 30 by first removable or permanent axial connecting means, and the second connecting element 35 is secured to the second end part 34 by second removable or permanent axial connecting means. The first and second removable axial retaining means are identical to the removable axial retaining means described above. In variant, the first connecting element 31 and the second connecting element 35 are secured to the central power sensing module 14 by the removable axial retaining means. In another variant, the first connecting element 31 and the second connecting element 35 are respectively secured to the first end cap 30 and the second end cap 34 by the permanent axial retaining means.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sensorized rolling elements.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sensorized roller for a rolling bearing comprising:
    a roller body having an axial length and a bore that extends axial through the roller body,
    a housing configured to fit in the roller bore, the housing comprising:
        a central sensing module having an axial length and including at least one sensor configured to measure at least one parameter related to a condition of the sensorized roller,
        an antenna module having an axial length and being secured to a first axial end of the central sensing module and including an antenna and meeting the central sensing module at first joint, and
        a power module having an axial length and being secured to a second axial end of the central sensing module and including a power supply and meeting the central sensing module at a second joint.

2. The sensorized roller according to claim 1, wherein a sum of the axial length of the central sensing module, the axial length of the antenna module and the axial length of the power module is equal to the axial length of the roller body.

3. The sensorized roller according to claim 1, wherein the central sensing module, the antenna module and the power module are each cylindrical.

4. The sensorized roller claim 1,
    wherein the antenna module forms a first end cap at the first end of the central sensing module and the power module forms a second end cap at the second end of the central sensing module.

5. The sensorized roller according to claim 4, wherein the first end cap and the second end cap are removably connected to the central sensing module.

6. The sensorized roller according to claim 4,
    wherein the axial length of the first end cap is substantially equal to the axial length of the second end cap.

7. The sensorized roller according to claim 1,
wherein the antenna module forms a first end cap and includes a first connector configured to secure the first end cap to the first axial end of the central sensing module, and
wherein the power module forms a second end cap and includes a second connector configured to secure the second end cap to the second axial end of the central sensing module.

8. The sensorized roller according to claim 7,
wherein the first connecting element and the second connecting element are secured to the central sensing module with permanent axial retaining means,
wherein the first end cap and the first connecting element are secured together with first removal axial retaining means, and
wherein the second end cap and the second connecting element are secured together with second removal axial retaining means.

9. The sensorized roller according to claim 7, wherein the axial length of the first end cap is substantially equal to the axial length of the second end cap.

10. The sensorized roller according to claim 1,
wherein the antenna module and/or the power module includes a main portion and a connector portion releasably connected to the main portion at a joint.

11. The sensorized roller according to claim 1,
wherein the antenna module and/or the power module includes a main portion and a connector portion permanently connected to the main portion at a joint.

12. A rolling bearing comprising:
a first ring,
a second ring configured to rotate concentrically relative to one another, and
a row of rollers interposed between a first raceway of the first ring and a second raceway of the second rings,
wherein at least one roller of the row of rollers is a sensorized roller according to claim 1.

* * * * *